United States Patent
Günther

(10) Patent No.: US 12,024,007 B2
(45) Date of Patent: Jul. 2, 2024

(54) FRAME STRUCTURE PART

(71) Applicant: Kirchhoff Automotive Deutschland GmbH, Attendorn (DE)

(72) Inventor: Alexander Günther, Olpe (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 345 days.

(21) Appl. No.: 17/636,290

(22) PCT Filed: Sep. 7, 2020

(86) PCT No.: PCT/EP2020/074954
§ 371 (c)(1),
(2) Date: Feb. 17, 2022

(87) PCT Pub. No.: WO2021/048055
PCT Pub. Date: Mar. 18, 2021

(65) Prior Publication Data
US 2022/0297524 A1    Sep. 22, 2022

(30) Foreign Application Priority Data
Sep. 9, 2019  (DE) ............. 10 2019 124 066.2

(51) Int. Cl.
*B60K 1/04* (2019.01)
*H01M 50/238* (2021.01)
*H01M 50/242* (2021.01)

(52) U.S. Cl.
CPC ............. *B60K 1/04* (2013.01); *H01M 50/238* (2021.01); *H01M 50/242* (2021.01); *B60Y 2306/01* (2013.01); *H01M 2220/20* (2013.01)

(58) Field of Classification Search
CPC ..... B60K 1/04; H01M 50/242; B60Y 2306/01
See application file for complete search history.

(56) References Cited

U.S. PATENT DOCUMENTS

| 8,950,794 B2 | 2/2015 | Lenkenhoff |
| 9,446,799 B2 | 9/2016 | Franzpötter |

(Continued)

FOREIGN PATENT DOCUMENTS

| CN | 108058750 A | 5/2018 |
| CN | 207664095 U | 7/2018 |

(Continued)

OTHER PUBLICATIONS

Examination report dated Apr. 21, 2023 in related Chinese application 202080062707.9.

(Continued)

*Primary Examiner* — Jason D Shanske
*Assistant Examiner* — James J Triggs
(74) *Attorney, Agent, or Firm* — Polson Intellectual Property Law P.C.; Margaret Polson; Christopher Sylvain

(57) ABSTRACT

A frame structure of a battery housing for a vehicle driven by an electric motor. The frame structure is composed of individual profiled hollow-chamber sections which are designed to be at least two-chambered in the z-direction and are welded together to enclose a battery volume. The end faces of two profiled hollow-chamber sections are designed to be stepped, such that an end face portion of each of the two profiled hollow-chamber sections borders a lateral surface portion of the respective other profiled hollow-chamber section.

18 Claims, 5 Drawing Sheets

(56) References Cited

U.S. PATENT DOCUMENTS

| | | | |
|---|---|---|---|
| 9,598,100 | B2 | 3/2017 | Lenkenhoff |
| 9,764,764 | B2 | 9/2017 | Irle |
| 10,005,495 | B2 | 6/2018 | Töller |
| 10,577,025 | B2 | 3/2020 | Michler |
| 10,661,646 | B2 * | 5/2020 | Matecki ................ B60L 50/66 |
| 10,882,559 | B2 | 1/2021 | Gundogan |
| 11,148,623 | B2 | 10/2021 | Günther |
| 11,235,720 | B2 | 2/2022 | Höning et al. |
| 11,292,409 | B2 | 4/2022 | Töller |
| 11,505,146 | B2 | 11/2022 | Weige |
| 11,660,950 | B2 * | 5/2023 | Matecki ................ B60L 50/64 |
| | | | 180/68.5 |
| 11,688,910 | B2 * | 6/2023 | Stephens ............... B60L 50/64 |
| | | | 429/96 |
| 11,833,914 | B2 * | 12/2023 | Collins ................. H01M 50/24 |
| 2011/0143179 | A1 * | 6/2011 | Nakamori ........... H01M 50/271 |
| | | | 429/99 |
| 2016/0228965 | A1 | 8/2016 | Ciampa et al. |
| 2016/0236815 | A1 | 8/2016 | Liao et al. |
| 2019/0344385 | A1 | 11/2019 | Töller |
| 2020/0398895 | A1 | 12/2020 | Gunther et al. |
| 2022/0009435 | A1 | 1/2022 | Günther |
| 2022/0024399 | A1 | 1/2022 | Tlauka |
| 2022/0029235 | A1 * | 1/2022 | Handing ................ B60L 50/64 |
| 2022/0144068 | A1 * | 5/2022 | Burja ..................... B60L 58/26 |
| 2022/0258684 | A1 | 8/2022 | Günther |
| 2022/0281532 | A1 | 9/2022 | Tentscher |
| 2022/0289304 | A1 | 9/2022 | Weige |
| 2022/0297524 | A1 | 9/2022 | Günther |
| 2022/0314912 | A1 | 10/2022 | Töller |
| 2022/0363211 | A1 | 11/2022 | Günther |
| 2023/0039843 | A1 | 2/2023 | Gündogan |
| 2023/0202567 | A1 * | 6/2023 | Günther ............... B62D 21/152 |
| | | | 296/187.09 |
| 2024/0055732 | A1 * | 2/2024 | Wu ...................... H01M 50/55 |

FOREIGN PATENT DOCUMENTS

| | | |
|---|---|---|
| CN | 207896157 U | 9/2018 |
| CN | 109130821 A | 1/2019 |
| CN | 109148755 A | 1/2019 |
| DE | 2753289 A1 | 5/1979 |
| DE | 102015007960 A1 | 12/2016 |
| DE | 102016115611 B3 | 2/2018 |
| EP | 2555277 A1 | 2/2013 |

OTHER PUBLICATIONS

International Search Report dated Mar. 18, 2021 in parent PCT application PCT/EP2020/074954.
Written Opinion of the International Searching Authority Mar. 18, 2021 in parent PCT application PCT/EP2020/074954. Machine translation provided.
Examination Report dated Jun. 24, 2020 in related German application DE 102019124066.2. Machine translation provided.
Examination report dated Jan. 13, 2024 in related Chinese application 202080062707.9.

* cited by examiner

FRAME STRUCTURE PART

BACKGROUND

The present disclosure relates to a frame structure of a battery housing for a vehicle driven by an electric motor, said frame structure being composed of individual profiled hollow-chamber sections which are designed to be at least two chambered in the z-direction and are welded together to enclose a battery volume.

In vehicles driven by electric motors, such as passenger cars, industrial trucks or the like, battery modules are used as energy storage devices. Such battery modules are typically composed of a large number of individual battery cells. These batteries are typically so-called high-voltage batteries. High demands are placed on the accommodation of such battery modules, which are necessary for the operation of such a vehicle. It is essential that the battery modules are adequately protected in their battery housing against crash-related forces in order to meet the required safety standards. The design of the corners of the frame structure parts plays a particularly important role in this case since they are subject to particularly high forces in the event of a crash. In addition, in the context of legal requirements, the battery housing must be sealed with respect to the environment.

US 2011/0143179 A1 discloses a battery housing in which, to provide mechanical protection, in particular for the battery module(s) accommodated therein, a tray part is surrounded by a frame structure, which frame structure is formed from individual profile sections assembled to form a frame profile. To save weight, extruded light metal profiled hollow-chamber sections, typically extruded aluminum profiles, are used as profile sections. Corner connectors are used to form corners, wherein the end faces of each adjoining profiled hollow-chamber section are adjacent thereto. Another battery housing of this type is known from DE 10 2016 115 611 B3.

DE 27 53 289 A discloses a window frame made from frame legs which are mitered, provided with mini prongs on the mitered surfaces and glued together as unrelated prior art.

Welded corner butt joints of profiled hollow-chamber sections are also used as miter joints in the frame structures of battery housings. However, frame structures of this type only have insufficient crashworthiness, since side impact forces acting on the structure are introduced as shearing forces directly into the welded joint connecting the miter abutments. It is also previously known that such a frame structure is provided by butt-welded profiled hollow-chamber sections. In such a configuration, one profiled hollow-chamber section borders with its end face on the lateral surface of a second profiled hollow-chamber section. Such a support is favorable for the desired crashworthiness of the frame structure. The disadvantage of a frame structure with such a corner design, however, is that the corner connection formed in this way is only form-fitting and thus crash-optimized in only one direction—either the x- or y-direction.

SUMMARY

Proceeding from this background, an aspect of the present disclosure is to provide a frame structure which is not only simple and inexpensive to manufacture, but is also characterized by improved crash performance.

This is achieved by a generic frame structure of the type mentioned at the outset, wherein the end faces of two profiled hollow-chamber sections adjoining each another in order to form a corner are designed to be stepped such that an end face of each of the two profiled hollow-chamber sections borders a lateral surface portion of the respective other profiled hollow-chamber section.

The directions used herein—the x-direction, the y-direction, and the z-direction—are the coordinate directions of a vehicle: the x-direction being the longitudinal extension, the y-direction being the extension in the lateral or transverse direction, and the z-direction being the vertical extension (vertical axis) of the vehicle. This coordinate system is analogously applied to the description of the structure. A profiled hollow-chamber section may also be referred to as a hollow chamber profile.

Such a frame structure typically comprises four profiled hollow-chamber sections connected to one another at an angle, typically for forming corners with included angles of 90 degrees, respectively. It is understood that other geometries of the frame structure are also conceivable. What is essential in this frame structure is that the profiled hollow-chamber sections adjoining each other to form a corner are at least two-chambered in the z-direction. It is then possible to design stepped end faces of the profiled hollow-chamber sections, wherein each profile section forming such a step in the end face remains peripherally closed. In such an embodiment, the stepped structuring of the end face lies in the web providing the two-chamber design. If profiled hollow-chamber sections are provided which have more than two chambers in the z-direction, the one or more steps forming the stepped structure in the end face of such a profiled hollow-chamber section are formed in the webs connecting the two lateral surfaces. For this purpose, these webs are preferably provided at right angles to the lateral surface which is bordered by the end face of the further profiled hollow-chamber section used for forming the corner.

Due to this support arrangement, in which each profiled hollow-chamber section is supported with an end face portion on a lateral surface portion of the other profiled hollow-chamber section involved in the corner construction, a positive or form fit is created in the x-direction and in the y-direction. In order to achieve this, each profiled hollow-chamber section engages with a portion thereof (seen in the z-direction) over or under the complementary profiled hollow-chamber section provided for forming the corner with respect to the structuring of its end face. With a two-stepped configuration of the end faces of the two adjacent profiled hollow-chamber sections, a positive fit in the z-direction is also provided. With a two-stepped configuration of the end faces of the adjoining profiled hollow-chamber sections, the positive fit in the z-direction is effective in only one direction. This is already considered to be sufficient in a number of applications, since this positive fit interlocks the two adjacent profiled hollow-chamber sections to form the corner, while the locking in the other z-direction not involved in the positive fit is obtained by the attachment of the battery housing or the frame structure to the vehicle. Locking in the other z-direction is also possible by means of an analogously designed cover part, the frame structure of which is connected to that of the lower part, for example by bolts.

Due to the positive fit of the profiled hollow-chamber sections adjoining each other to form the corners, which acts in several directions, the weld seams connecting these profiled hollow-chamber sections are significantly relieved in the event of forces to be absorbed by the frame structure. This not only contributes to optimizing the crash performance of such a frame structure. This also has advantages when performing the required welds. Due to the low mechanical requirements obtained through the special form-fitting support of the adjacent profiled hollow-chamber sections, the main focus during welding can be directed to the sealing which is also required for such a corner construction.

The stepped end faces of the adjacent corner-forming profiled hollow-chamber sections can also have a number of steps which is different from the above-described example embodiment, in which the end faces of the two adjacent profiled hollow-chamber sections are each formed with two steps. The number of steps can certainly be greater than two. The provision of end faces with more than two-steps is indicated if the profiled hollow-chamber sections adjoining each other to form the corner are to be locked in both z-directions. In such a configuration, for example, the end face of one of the two profiled hollow-chamber sections can have a number of steps that is one (1) step greater than the end face of the other adjacent profiled hollow-chamber section. For example, the end face of one profiled hollow-chamber section can be designed in three steps, while the end face of the other profiled hollow-chamber section has only two steps. In order to interlock the two profiled hollow-chamber sections in both z-directions, the end face of the three-step profiled hollow-chamber section is designed in such a way that a middle step is set back compared to the two outer steps. Consequently, the end face portion forming the middle step is bordered by the other two steps. The greater the number of interlocking steps on the end faces of adjacent profiled hollow-chamber sections, the more secure such a corner design is. The number of steps on the profiled hollow-chamber sections that are engaged with one another to form the corners will be determined depending on the design of the chambers of the profiled hollow-chamber sections and the manufacturing costs. The number of steps and the resulting interlocking is therefore a compromise between the crash performance to be achieved by the frame structure and the effort required for production.

In order to obtain an interlocking, as described above, between the profiled hollow-chamber sections adjoining each other to form the corner, it is understood that a profiled hollow-chamber section has, on its lateral surface, a lateral surface portion that is complementary to the end face of the other profiled hollow-chamber section. In a three-step design, for example, the lateral surface portion extends up to the set-back end-face portion of the middle step of the profiled hollow-chamber section.

The concept of mutual end support of adjacent corner-forming profiled hollow-chamber sections allows a configuration in which the end face portion of one profiled hollow-chamber section can be arranged at a distance from the edge of the lateral surface portion of the other profiled hollow-chamber section to which it is adjacent. With regard to the end-face termination of the other profiled hollow-chamber section, this is possible if the end face portion of the other hollow-chamber profile is arranged at a small distance from the end-face termination of the one hollow-chamber profile. This projection can be used as a weld pool support. If a certain projection is also to be provided in the height direction (z-direction) to the adjoining end face of the other profiled hollow-chamber section, it is possible to extend the lateral surface with a web, so that a weld pool support is also provided in this respect. Such a web is not desired on the finished frame structure. Since the welded seams that have been formed have to be machined at least in the plane (x-y plane) of their upper end, the weld pool web can also be removed without additional effort. The width of such a weld pool support over the outline geometry of one profiled hollow-chamber section, which borders with its end face portion on the lateral surface portion of the other profiled hollow-chamber section providing the weld pool support, does not have to be particularly large. It is considered to be sufficient if the projection forming the weld pool support amounts to 10% to 15% of the wall thickness of the profiled hollow-chamber sections. It goes without saying that the projection can also be larger or smaller. The extent of the projection is also dependent on the selected welding process.

In addition, a connecting web can be formed onto the profiled hollow-chamber sections of the frame structure on their lateral surfaces pointing towards the battery volume, which connecting web provides a contact surface for a base part or lid for closing the frame structure on the underside. These surrounding connecting webs are also welded together in the area where they adjoin each another. A base part for closing the frame structure can either be placed in the interior of the frame structure on the peripheral connection web, or it can be connected thereto from the outside. Such a base part can be a base plate, as well as a profiled hollow-chamber section plate. Irrespective of the type of base part used, the frame structure, which already has a very high degree of reinforcement, is thereby additionally reinforced. It goes without saying that if such a frame structure is used as a cover part, the base part is a cover part. This base or cover part is typically connected in a sealed manner to the peripheral connecting web.

The profiled hollow-chamber sections are preferably extruded profiles made from a suitable aluminum alloy. The use of a light metal, such as an aluminum alloy, optimizes the frame structure in terms of its weight.

The process reliability with regard to the fluid-tightness of the required welded joints can be increased by welding the adjoining profiled hollow-chamber sections in one go, which is achieved by rotating a table that supports the hollow chambers to be welded to one another, or another suitable carrier for holding the hollow chambers to be welded to one another, so that welding is only possible in the horizontal plane. The support table or bracket is rotated by 90 degrees each time the weld seam is guided from one edge to the next.

To this end, it is expedient if those profile edges which represent the outer edges of the profile, and around which welding is carried out in one go from one edge to the other, have a greater wall thickness than the material specification. This avoids the risk of accidental melt-through.

If a peripheral seal is to be arranged on the peripheral upper side of a frame structure designed as part of a battery base, for example, or on the lower side of a frame structure serving as part of a battery upper part, the profiling of the profiled hollow-chamber sections can have a sealing groove on the outside of the wall forming the top end thereof, which groove follows the longitudinal extension of such profiles. In such an embodiment, the ends of the steps that carry the sealing groove on the upper side are mitered, so that the openings of the sealing grooves on the abutting side adjoin one another. In such an embodiment, the sealing groove is peripheral. If desired, the inside of the adjoining sealing grooves of this surface of the frame structure can be rounded in a machining step, which is anyway required after the welding step. The step with its upper wall forming the sealing groove does not need to have any particular height. Thus, in the case of a multi-chamber profiled hollow-chamber section, there generally remains sufficient height to nevertheless form the desired stepped structure.

BRIEF DESCRIPTION OF THE DRAWINGS

The present disclosure is described below using example embodiments with reference to the attached figures, wherein.

DETAILED DESCRIPTION

Figure 9:
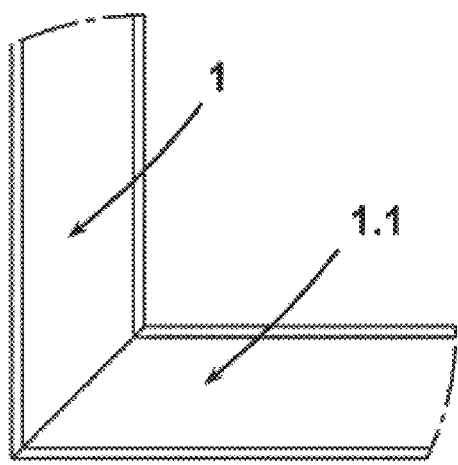
FIG. 9 shows a top view of two prior art corner designs of frame structures as part of battery housings, in which adjacent profiled hollow-chamber sections are mitered to form the corner (left) and in which a profiled hollow-chamber section is supported with its end face on the lateral surface of the adjacent profiled hollow-chamber section (right).
Figure 9:
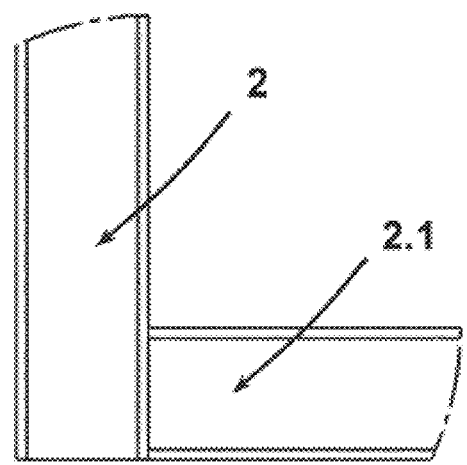

FIG. 9 shows two different corner configurations of frame structures as part of battery housings or battery housing parts according to the prior art. In the illustration on the left, the two corner-forming profiled hollow-chamber sections 1, 1.1 adjoining each other are connected to one another on their entire end face at the miter joint. According to a further previously known embodiment for corner construction on a frame structure of a battery housing or a battery housing part, a profiled hollow-chamber section 2 borders with its end face on a lateral surface of the adjoining profiled hollow-chamber section 2.1 (right illustration). In both cases, the impact energy in the event of a crash has a considerable effect on the weld seams connecting the two hollow-chamber profiles. In the configuration shown on the right in FIG. 9, it is unlikely that energy will be transmitted in a form-fitting manner from one profiled hollow-chamber section 2 or 2.1 to the other profiled hollow-chamber section 2.1 or 2, so that in this case too, in the event of a crash, a considerable amount of energy is transmitted to the weld seam connecting the two profiled hollow-chamber sections 2, 2.1.

Figure 1:
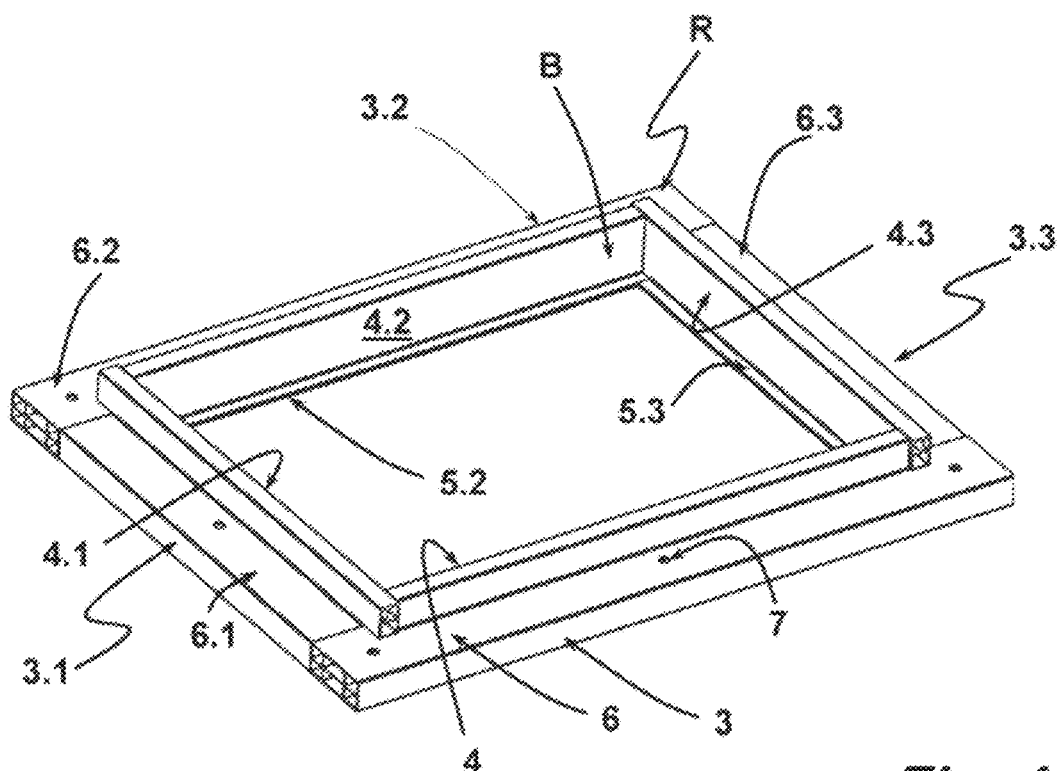
FIG. 1 shows a perspective view of a frame structure according to the present disclosure as part of a battery housing.

The frame structure R according to the present disclosure shown in FIG. 1 comprises four profiled hollow-chamber sections 3, 3.1, 3.2, 3.3 which are connected to each other at right angles and enclose a battery volume B. The battery volume B is used to receive one or more battery modules. If there are several battery modules, they can be separated from each other by a compartment. The frame structure R is part of a battery housing for accommodating batteries or battery modules for a vehicle driven by an electric motor. The frame profiles 3, 3.1, 3.2, 3.3 have straight inner lateral surfaces 4, 4.1, 4.2, 4.3 extending in the vertical direction.

At the lower end of the profiled hollow-chamber sections 3, 3.1, 3.2, 3.3, which can be seen in FIG. 1, connecting webs 5, 5.1, 5.2, 5.3 projecting into the frame structure R from the lateral surfaces 4, 4.1, 4.2, 4.3 are formed. These connecting webs 5, 5.1, 5.2, 5.3 are used to connect a base part, either by inserting it into the battery volume B to rest on the top side of the connecting webs, or by connecting it on their underside. If the frame structure R is part of a cover part, a cover part is connected to the connecting webs instead of a base part.

It is already clear from the illustration in FIG. 1 that the profiled hollow-chamber sections 3, 3.1, 3.2, 3.3 are L-shaped. The lower, horizontally extending leg points away from the battery volume B towards the outside. In the top sides 6, 6.1, 6.2, 6.3 of these legs of the profiled hollow-chamber sections 3, 3.1, 3.2, 3.3, fastening holes 7 are introduced, which pass through these legs. These are used to fasten a cover part, not shown in the figures, and also to fasten the frame structure R to the chassis of a vehicle.

Figure 2:
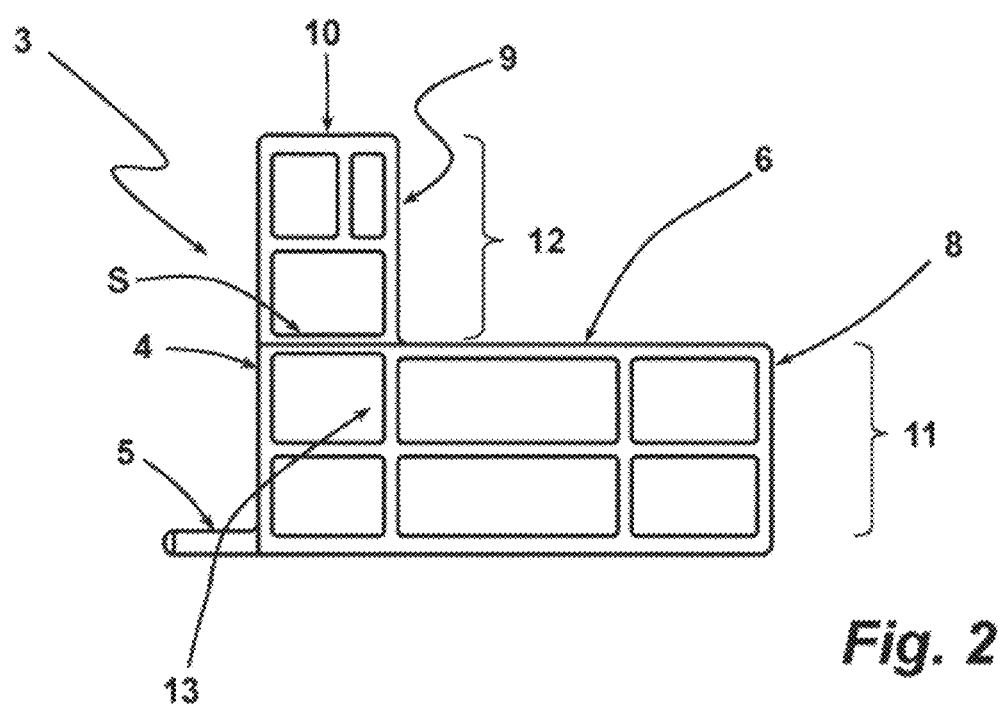
FIG. 2 shows an end view of a profiled hollow-chamber section of the frame structure of FIG. 1.

FIG. 2 shows an end view of the end face of the profiled hollow-chamber section 3 of FIG. 1. The L-shaped cross section is clearly visible, as well as the connecting web 5, which is not visible in FIG. 1 for perspective reasons. In this example embodiment, the lateral surface 4 is straight in the vertical direction (z-direction) and is therefore not provided with a step. The outward-facing lateral surface of this profiled hollow-chamber section 3 is stepped and, in addition to the surface 6 extending in the x-y direction, has two adjacent lateral surface portions 8, 9 extending in the z direction, wherein both lateral surface portions 8, 9 each represent a step (see also FIG. 3). In the end view of FIG. 2, these steps are identified by reference numerals 11, 12. The end faces are identified by reference numerals 13, 13.1.

The vertical leg in the z-direction in FIG. 2 is a multi-chamber leg, wherein the middle longitudinal plane of a chamber web S lies in the plane of surface 6. This design of the profiled hollow-chamber section 3 means that the step 12 can be removed in an end portion from the step 11 formed by the lower leg without one of the two profiled hollow-chamber section parts being opened by removing this end portion of the step 12. This improves the dimensional stability during welding.

Figure 3:
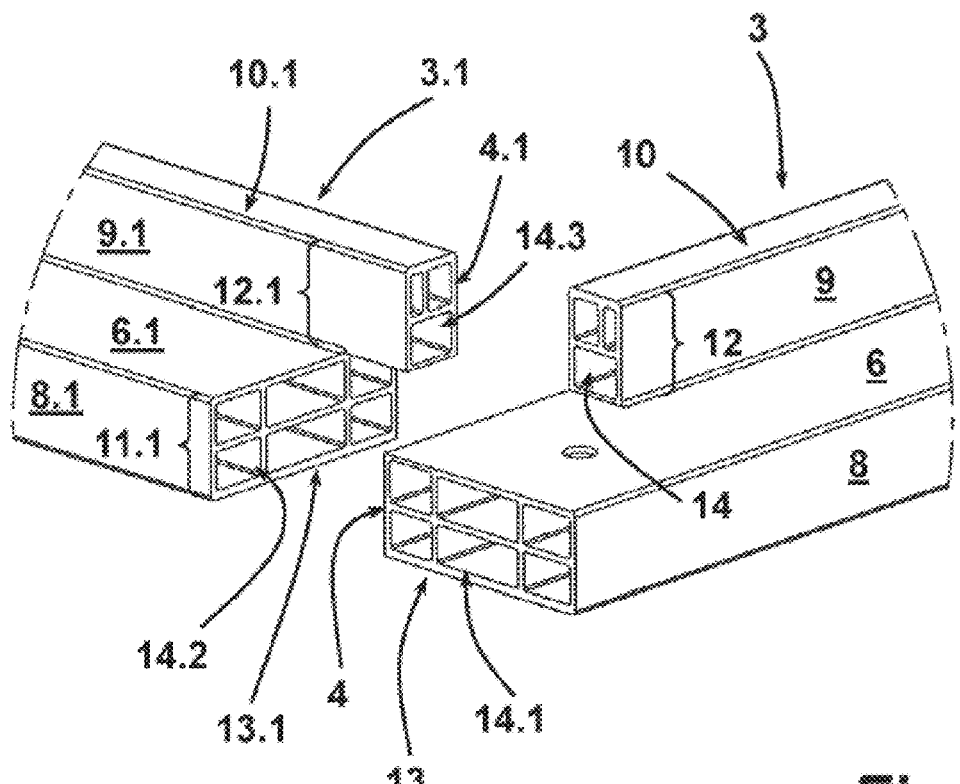
FIG. 3 shows a perspective view of two profiled hollow-chamber sections to be connected to create a corner construction of the frame structure of FIG. 1.

FIG. 3 shows the profiled hollow-chamber section 3 with the profiled hollow-chamber section 3.1 adjoining it for corner construction, with stepped end faces 13, 13.1. The stepped design has been transformed into its two-stepped configuration in the case of the profiled hollow-chamber section 3 by removing the originally present end portion of step 12. The two face portions of this stepped formation are identified by the reference numerals 14, 14.1. It can be clearly seen that removing this portion of step 12 does not open any of the remaining chambers of profiled hollow-chamber section 3. In the case of the profiled hollow-chamber section 3.1, on the other hand, the step 12.1 has been maintained with respect to the lower step 11.1. Consequently, an end portion of step 11.1 has been removed from the original extruded profile section in the same parting plane as in the case of the profiled hollow-chamber section 3. Thus, the end face 13.1 of the profiled hollow-chamber section 3.1 is also designed in two steps, so that the profiled hollow-chamber section 3.1 also has two end face portions 14.2, 14.3 at the end shown in FIG. 3. FIG. 3 shows the two profiled hollow-chamber sections 3, 3.1 before their assembly for the desired corner construction of the frame structure R.

In order to obtain the desired corner construction, the two profiled hollow-chamber sections 3, 3.1 are brought together so that the end face portion 14 of the profiled hollow-chamber section 3 borders on the portion of the lateral surface 4.1 which remains after removing the end portion of step 11.1. The end face portion 14.2 of the profiled hollow-chamber section 3.1 is brought up to the lateral surface 4, so that this end face portion 14.2 is supported on the complementary lateral surface portion of the profiled hollow-chamber section 3.

Figure 4:
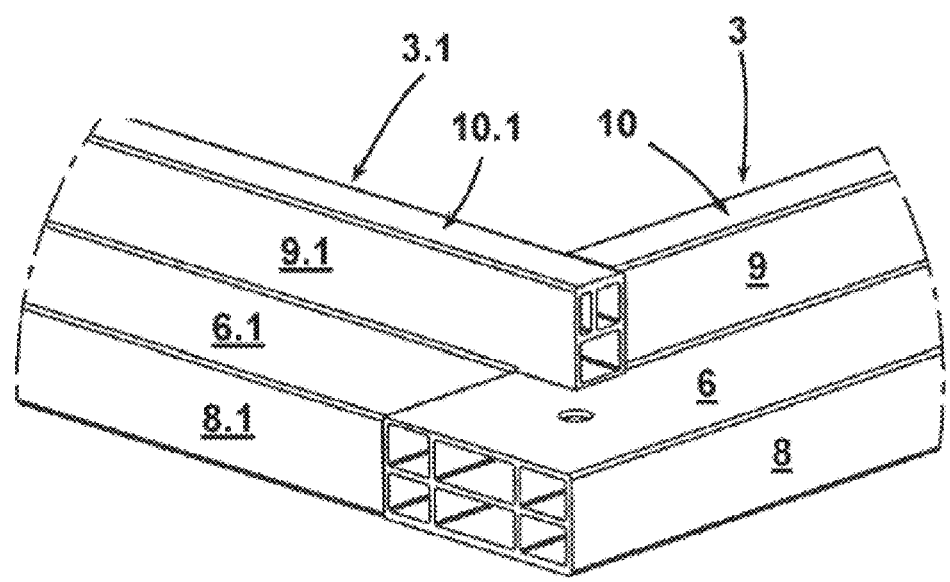
FIG. 4 shows the profiled hollow-chamber sections of FIG. 3 assembled to form the corner.
Figure 5:
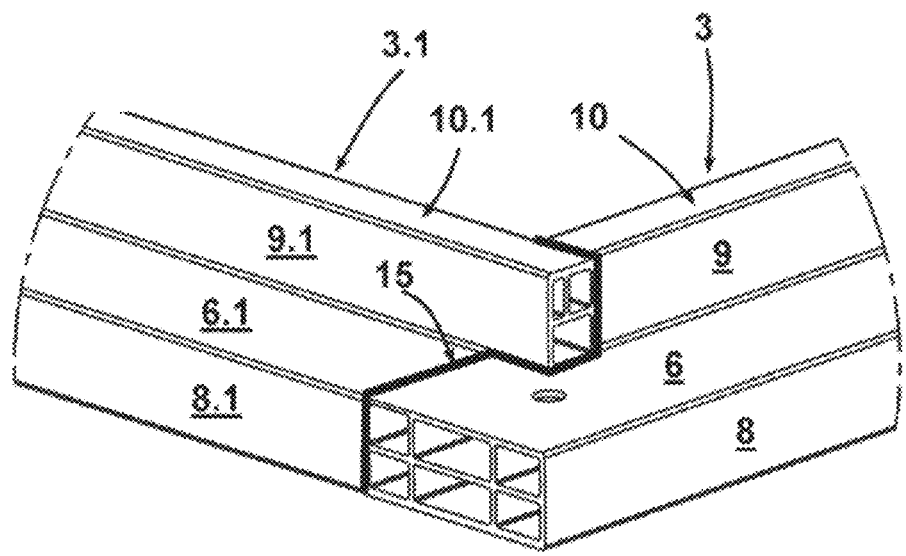
FIG. 5 is the representation of FIG. 4 supplemented by a weld seam, with which the two profiled hollow-chamber sections shown are connected.

FIG. 4 shows the assembly of the two profiled hollow-chamber sections 3, 3.1 before welding. This corner construction is welded along the profiled hollow-chamber sections 3, 3.1, as shown schematically in FIG. 5. The weld seam is identified therein by the reference numeral 15.

The assembly of the two profiled hollow-chamber sections 3, 3.1 to form the corner construction shown in the figures clearly shows that the two profiles are adjacent to each other forming a positive fit in the x and y direction and that there is also a positive fit between the two profiled hollow-chamber sections 3, 3.1 in a z-direction, in particular in relation to a movement of the two profiled hollow-chamber sections 3, 3.1 towards each other.

Figure 6A:
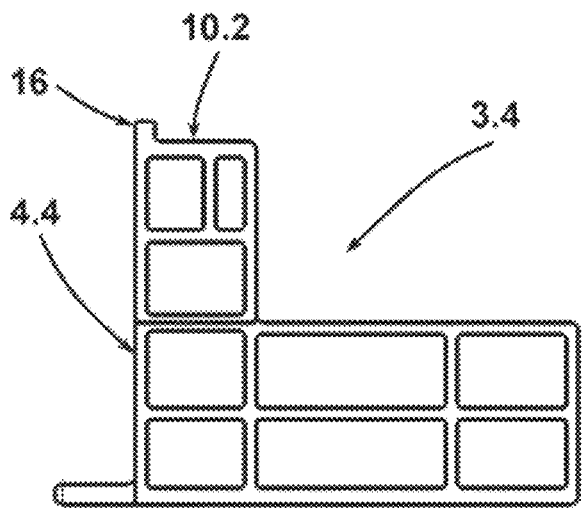
FIG. 6a shows an end view of another profiled hollow-chamber section.
Figure 6B:
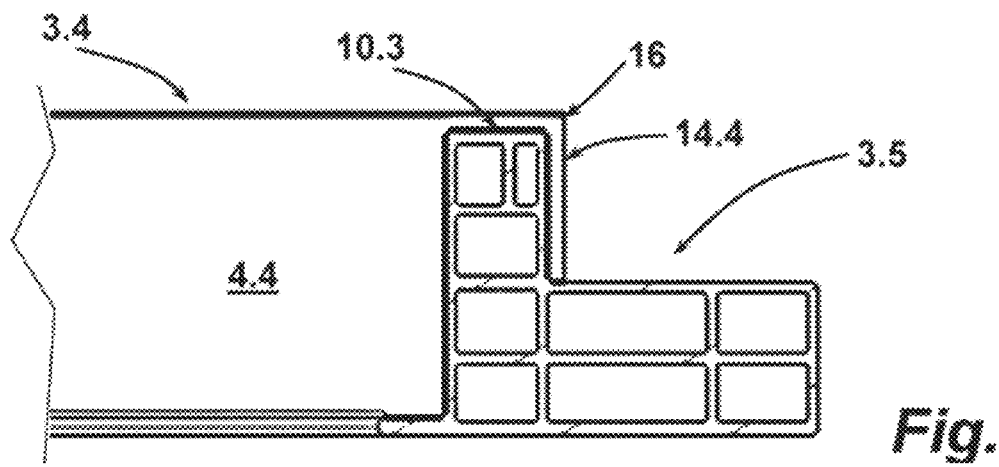
FIG. 6b shows an illustration in which an end face portion of a complementary profiled hollow-chamber section is arranged on the lateral surface of the profiled hollow-chamber section of FIG. 6a, FIG. 7 shows a perspective view of two profiled hollow-chamber sections to be connected to one another to form a corner of a frame structure as part of a battery housing according to a further embodiment.

FIG. 6a shows another profiled hollow-chamber section 3.4, which is constructed like the previously described profiled hollow-chamber section 3.1. The profiled hollow-chamber section 3.4 differs from the profiled hollow-chamber section 3.1 in that it has a web 16 formed thereon which extends its inner lateral surface 4.4 and projects beyond its surface 10.2. This web 16 forms a weld pool support when this profiled hollow-chamber section 3.4 is assembled with a complementary profiled hollow-chamber section 3.5. The complementary profiled hollow-chamber section 3.5 is designed like the profiled hollow-chamber section 3. The assembly of the two profiled hollow-chamber sections 3.4, 3.5 is shown in FIG. 6b in a longitudinal sectional view looking at the lateral surface 4.4 of the profile hollow-chamber section 3.4, which is facing the battery volume B. The web 16 projects beyond the top 10.3 of the profiled hollow-chamber section 3.5, thus providing a weld pool support. In order to also provide a weld pool support for the end face portion 14.4 of the profiled hollow-chamber section 3.4, the profiled hollow-chamber section 3.5 is slightly set back with its outwardly facing lateral surface portion with respect to the end face 14.4. The concept of providing a weld pool support through the web 16, which protrudes beyond the actual top side 10.2, 10.3, makes use of the fact that this upper side is machined anyway in a step following the welded connection in order to provide a flat upper side. In the course of this processing, the web 16 is removed.

Figure 7:
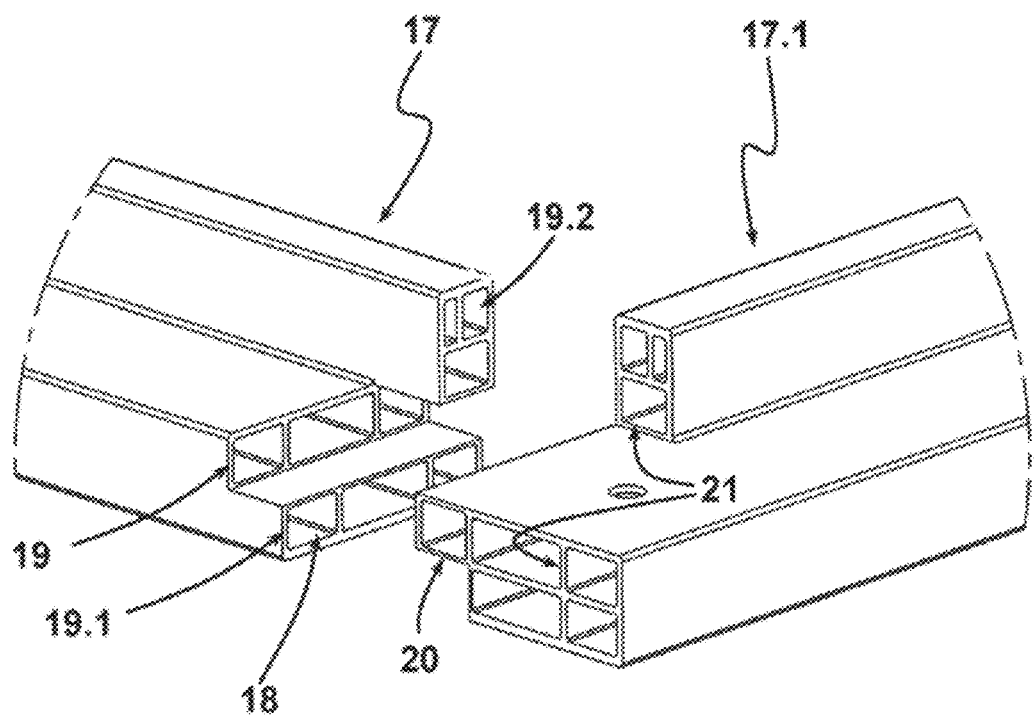

The profiled hollow-chamber sections 17, 17.1 shown in FIG. 7, which relate to a further development of the present disclosure, form the corners of a frame structure of a battery housing. In this corner design of the frame structure, one profiled hollow-chamber section 17 has a three-step design of its end face 18. The end face portions each forming a step are denoted by 19, 19.1, 19.2. The configuration of the profiled hollow-chamber section 17 differs from the profiled hollow-chamber section 3.1 of the example embodiment described above in that the lower step is divided into two individual steps—the steps with the end face portions 19, 19.1. As can be seen from FIG. 7, the lower step of the previously described profiled hollow-chamber section 3.1 is also designed in two chambers in the z-direction. A portion of the upper chamber is removed over the entire width of the profiled hollow-chamber section 17 in a way that has already been described for the example embodiment in FIGS. 1 to 5, without a profile chamber having been opened as a result. The end face portion 19 of the middle step is set back with respect to the end face portions 19.1 and 19.2. This receptacle, which is open in the direction of the profiled hollow-chamber section 17.1, receives a leg 20 formed by a single hollow chamber (seen in the z-direction) in the example embodiment shown. This is formed by removing the lower side wall portion and the adjacent base portion to open the corresponding hollow chamber. On the upper side, the leg is provided by removing an end portion of the upper step, as was already described with respect to the previous example embodiment.

While the end face 18 of the profiled hollow-chamber section 17 is provided with three steps, the end face 21 of the profiled hollow-chamber section 17.1 is provided with two steps, just like the end face of the profiled hollow-chamber section 3. Due to the engagement of the leg 20 in the U-shaped receptacle under the end face portion 19.2, both profiled hollow-chamber sections 17, 17.1 are positively interlocked in the z-direction in both directions.

Figure 8:
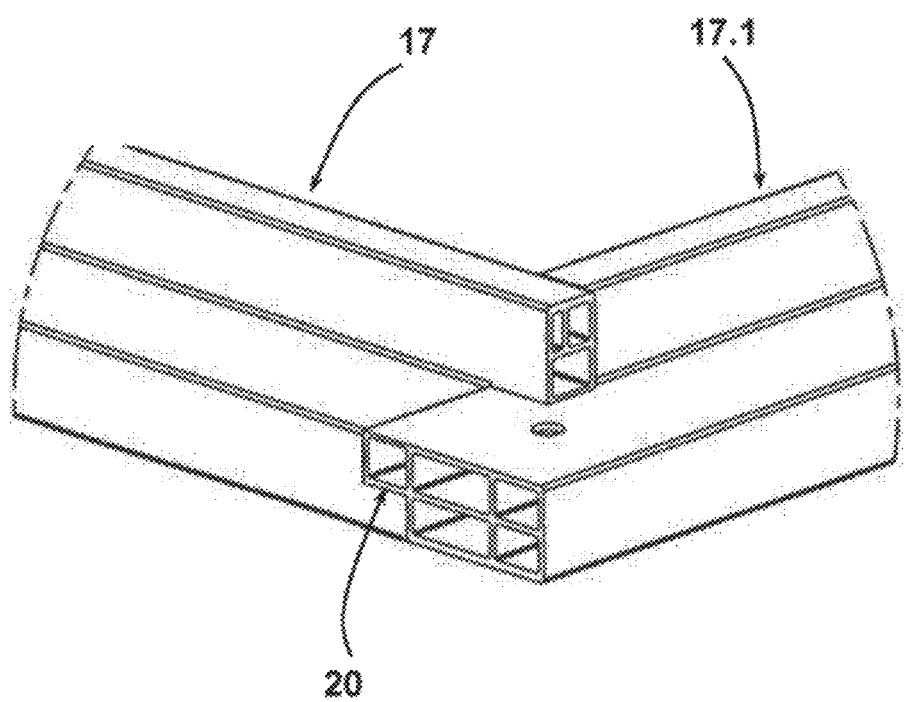
FIG. 8 shows the profiled hollow-chamber sections of FIG. 7 assembled together to form the corner.

FIG. 8 shows the two profiled hollow-chamber sections 17, 17.1 assembled to form a corner before the provision of a welded connection.

The invention has been described using several example embodiments with reference to the figures. Without departing from the scope of the claims, further embodiments and optional implementations of the invention will become clear to a person skilled in the art, without having to explain or show them in greater detail in the context of this disclosure.

LIST OF REFERENCE NUMERALS 1, 1.1 profiled hollow-chamber section
2, 2.1 profiled hollow-chamber section
3, 3.1, 3.2, 3.3 profiled hollow-chamber section
4, 4.1, 4.2, 4.3 lateral surface
5, 5.1, 5.2, 5.3 connecting web
6, 6.1, 6.2, 6.3 surface
7 fastening hole
8, 8.1 lateral surface portion
9, 9.1 lateral surface portion
10, 10.1 surface
11 step
12 step
13, 13.1 end face
14, 14.1, 14.2, 14.3 end face portion
15 weld
16 web
17.1 profiled hollow-chamber section
18 end face
19, 19.1, 19.2 lateral surface portion
20 leg
B battery space
R frame structure
S chamber web

The invention claimed is:

1. A frame structure of a battery housing for a vehicle driven by an electric motor, comprising:
profiled hollow-chamber sections which have at least two chambers in a vertical vehicle extension direction and which are welded together in order to enclose a battery volume,
wherein end faces of two profiled hollow-chamber sections adjoining each other to form a corner of the frame structure are stepped, such that each end face has at least two end face portions which terminate at different positions from one another, and an end face portion of each of the two profiled hollow-chamber sections borders a lateral surface portion of the respective other profiled hollow-chamber section.

2. The frame structure of claim 1, wherein the end faces of two adjacent profiled hollow-chamber sections are each provided with two steps.

3. The frame structure of claim 2, wherein lateral surfaces of the profiled hollow-chamber sections facing away from the enclosed battery volume are provided with steps, such that the profiled hollow-chamber sections have an L-shaped cross-sectional geometry with a horizontal leg that points outwards.

4. The frame structure of claim 2, wherein one of the two profiled hollow-chamber sections adjoining each other to form the corner is provided with a web following a longitudinal extension thereof as a weld pool support, in order to increase a lateral surface of the one profiled hollow-chamber section, which lateral surface is adjoined by the end face portion of the other profiled hollow-chamber section.

5. The frame structure of claim 2, wherein the end face portion of one profiled hollow-chamber section is arranged at a distance from the end face of the other profiled hollow-chamber section.

6. The frame structure of claim 2, wherein lateral surfaces of the profiled hollow-chamber sections facing towards the battery volume have a connecting web providing a connection flange for a base part or a cover part of the battery housing.

7. The frame structure of claim 1, wherein the end face of one profiled hollow-chamber section has a number of steps which is one step greater than the end face of the other profiled hollow-chamber section.

8. The frame structure of claim 7, wherein the end face of the one profiled hollow-chamber section is provided with three steps and the end face of the other profiled hollow-chamber section is provided with two steps, wherein the end face of the one profiled hollow-chamber section provided with three steps is stepped such that a middle step is set back with respect to two outer steps, wherein the other profiled hollow-chamber section has a lateral surface facing the end face of the one profiled hollow-chamber section, and the lateral surface is stepped such that the lateral surface portion borders on the middle step of the one profiled hollow-chamber section.

9. The frame structure of claim 7, wherein lateral surfaces of the profiled hollow-chamber sections facing away from the enclosed battery volume are provided with steps, such that the profiled hollow-chamber sections have an L-shaped cross-sectional geometry with a horizontal leg that points outwards.

10. The frame structure of claim 7, wherein one of the two profiled hollow-chamber sections adjoining each other to form the corner is provided with a web following a longitudinal extension thereof as a weld pool support, in order to increase a lateral surface of the one profiled hollow-chamber section, which lateral surface is adjoined by the end face portion of the other profiled hollow-chamber section.

11. The frame structure of claim 7, wherein the end face portion of one profiled hollow-chamber section is arranged at a distance from the end face of the other profiled hollow-chamber section.

12. The frame structure of claim 7, wherein lateral surfaces of the profiled hollow-chamber sections facing towards the battery volume have a connecting web providing a connection flange for a base part or a cover part of the battery housing.

13. The frame structure of claim 1, wherein lateral surfaces of the profiled hollow-chamber sections facing away from the enclosed battery volume are provided with steps, such that the profiled hollow-chamber sections have an L-shaped cross-sectional geometry with a horizontal leg that points outwards.

14. The frame structure of claim 1, wherein the end face portion of one profiled hollow-chamber section is arranged at a distance from the end face of the other profiled hollow-chamber section.

15. The frame structure of claim 1, wherein one of the two profiled hollow-chamber sections adjoining each other to form the corner is provided with a web following a longitudinal extension thereof as a weld pool support, in order to increase a lateral surface of the one profiled hollow-chamber section, which lateral surface is adjoined by the end face portion of the other profiled hollow-chamber section.

16. The frame structure of claim 15, wherein the end face portion of one profiled hollow-chamber section is arranged at a distance from the end face of the other profiled hollow-chamber section.

17. The frame structure of claim 1, wherein lateral surfaces of the profiled hollow-chamber sections facing towards the battery volume have a connecting web providing a connection flange for a base part or a cover part of the battery housing.

18. The frame structure of claim 1, wherein the profiled hollow-chamber sections of the frame structure are extruded aluminum profiles.

\* \* \* \* \*